United States Patent
Mauritz

[11] Patent Number: 5,458,015
[45] Date of Patent: Oct. 17, 1995

[54] GEARSHIFT TRANSMISSION OF A MOTOR VEHICLE HAVING A GEAR RATIO UTILIZING GEAR SETS OF OTHER GEAR RATIOS

[75] Inventor: Erwin Mauritz, Wiernsheim, Germany

[73] Assignee: Dr. Ing. h.c.F. Porsche Aktiengesellschaft, Weissach, Germany

[21] Appl. No.: 141,232

[22] Filed: Oct. 25, 1993

[30] Foreign Application Priority Data

Oct. 24, 1992 [DE] Germany ............ 42 36 000.5

[51] Int. Cl.⁶ .................................................. F16H 3/091
[52] U.S. Cl. ........................................... 74/333; 74/329
[58] Field of Search ................... 74/325, 331, 329, 74/333

[56] References Cited

U.S. PATENT DOCUMENTS 4,627,301  12/1986  Bainbridge et al. ............ 74/333

Primary Examiner—Charles A. Marmor
Assistant Examiner—Sherry Lynn Estremsky
Attorney, Agent, or Firm—Evenson McKeown Edwards and Lenahan

[57] ABSTRACT

A synchronized gearshift transmission of a motor vehicle has a drive shaft as well as a parallel output shaft and an auxiliary shaft. To form a high-reduction first gear, the power flow runs through reverse gear and fifth gear.

5 Claims, 5 Drawing Sheets

GEARSHIFT TRANSMISSION OF A MOTOR VEHICLE HAVING A GEAR RATIO UTILIZING GEAR SETS OF OTHER GEAR RATIOS

BACKGROUND AND SUMMARY OF THE INVENTION

The present invention relates to a gearshift transmission of a motor vehicle with a plurality of forward gears engageable by synchronizing clutches and a reverse gear, with the gear sets of the various gears being mounted on a drive shaft of a parallel output shaft and an auxiliary shaft and at least one output gear being formed by multiple utilization of existing gear pairs.

In a gearshift transmission of this kind, such as shown in German Patent Document 38 30 026, two forward gear pairs and two intermediate gears mounted on a countershaft are used to create reverse gear. The intermediate gears are connectable with one another in a torque-transmitting fashion by a shiftable clutch. One intermediate gear meshes with the fixed gear of first gear G1, the other intermediate gear with the idler gear of third gear G3. With the clutch engaged, the power flows from the input shaft of the transmission through the fixed gear of first gear G1 to the first intermediate gear, through the clutch to the second intermediate gear, to idler gear G3, and finally to fixed gear of G3 nonrotatably connected to the output shaft and meshing with idler gear G3. In this manner, the gear pair of the reverse gear that are otherwise usual can be eliminated.

An object of the invention is to eliminate at least one gear pair, even for forward gears, by using this principle of multiple utilization of gear pairs in order to reduce the overall length and manufacturing costs of the transmission.

This and other objects are achieved by the present invention which provides a gearshift transmission of a motor vehicle comprising a drive shaft, an output shaft parallel to the drive shaft, an auxiliary shaft, and a plurality of forward gears engageable by synchronizing clutches and a reverse gear. The gears have gear sets mounted on the drive shaft, the gear sets including gear pairs, with at least one of the gears being formed by multiple utilization of existing gear pairs. A high-reduction first gear is formed that includes the gear set of the reverse gear and a fixed gear mounted on the auxiliary shaft and meshing with the gear pair of a highest of the forward gears.

When, in order to create a high-reduction first gear, the power flow runs through the gear set of reverse gear and the gear pair of fifth gear, one gear pair for first gear can be eliminated. The overall length and manufacturing costs of the transmission are lower. The present invention lengthens the shaft of the reverse gear intermediate gear as an auxiliary shaft and mounts a fixed gear on it which meshes with the gear set of fifth gear. To engage first gear, the intermediate gear of reverse gear is connected by a half synchronizing clutch with the auxiliary shaft.

In certain embodiments of the invention, a second gear is additionally provided. For this purpose an additional idler gear is mounted on the auxiliary shaft, which meshes with the gear pair of third gear. To engage first gear, the intermediate gear of reverse gear is coupled to the auxiliary shaft, and to engage second gear the additional idler gear is coupled with the auxiliary shaft. To shift all gears, only one clutch needs to be actuated. The shift pattern is identical to the conventional H-pattern. A sixspeed transmission so designed requires only four gear pairs in succession for the forward gears. Since the overall length is extremely short, a transmission of this kind is best suited for installation crosswise on the front axle of a motor vehicle.

Other objects, advantages and novel features of the present invention will become apparent from the following detailed description of the invention when considered in conjunction with the accompanying drawings.

DETAILED DESCRIPTION OF THE DRAWINGS

Figure 1:
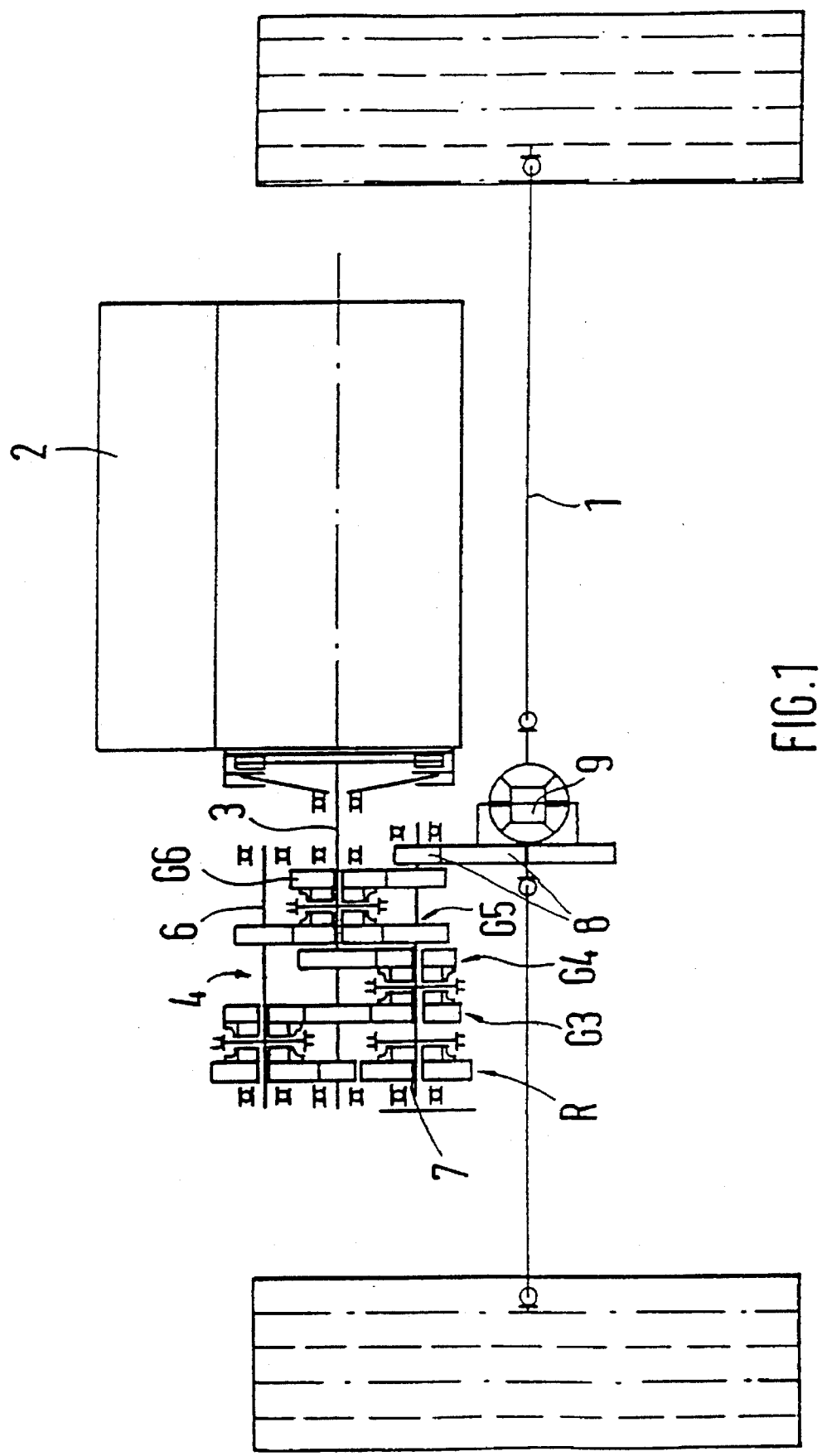
FIG. 1 is the front axle of a motor vehicle with a transversely mounted engine and gearshift transmission constructed in accordance with an embodiment of the present invention.

As seen in FIG. 1, a piston engine 2 is installed transversely near the front axle 1 of a motor vehicle. A drive shaft 3 emerging from the engine 2 is mounted in a similarly transverse synchronized gearshift transmission 4. An auxiliary shaft 6 and an output shaft 7 are mounted parallel to drive shaft 3 in transmission housing 5 (FIG. 2), by which drive shaft 3 the front axle 1 is driven through a cylindrical gear pair 8 and differential gearing 9.

Figure 2:
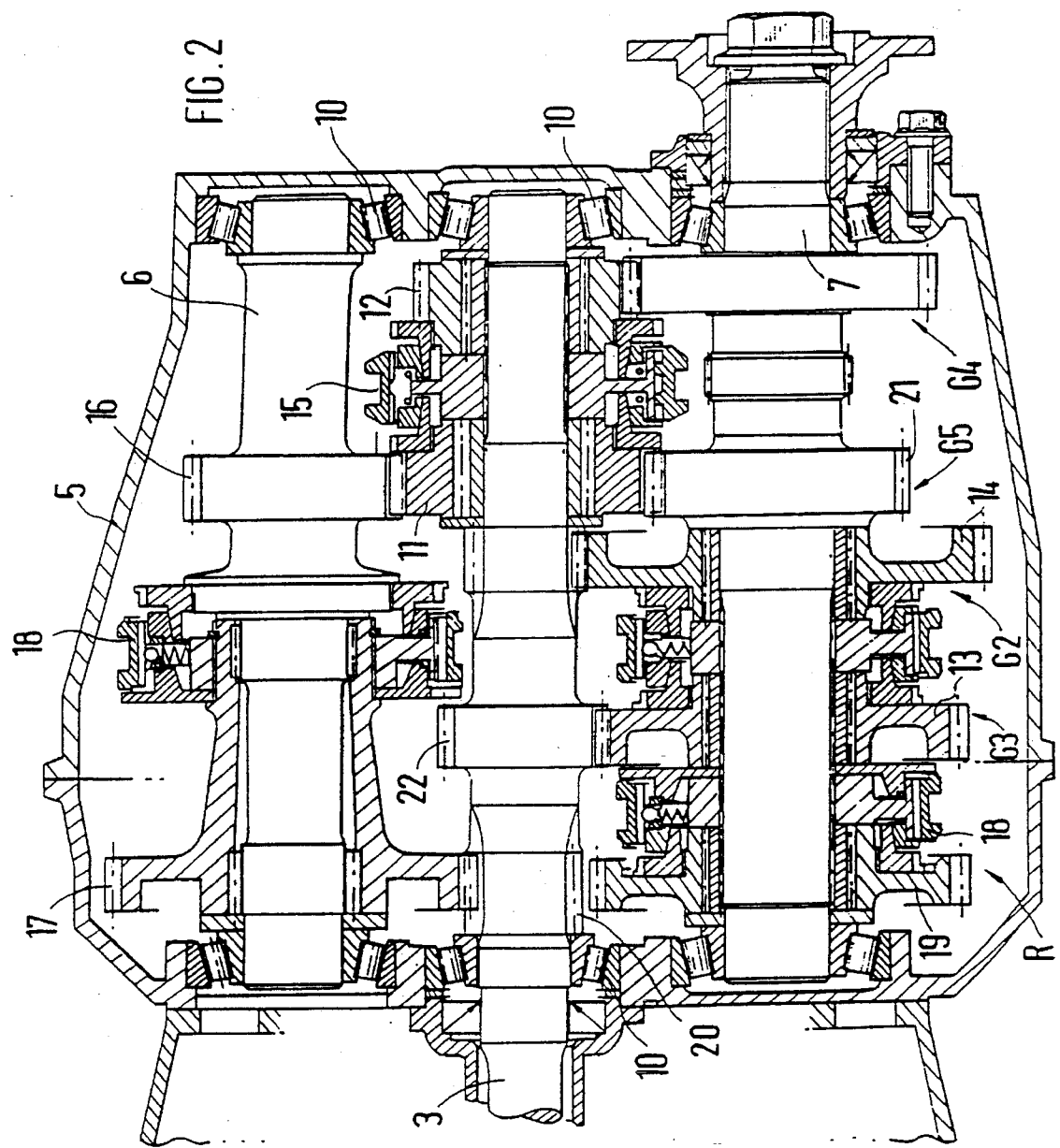
FIG. 2 is a lengthwise section through a three-shaft transmission constructed in accordance with an embodiment of the present invention.
Figure 3:
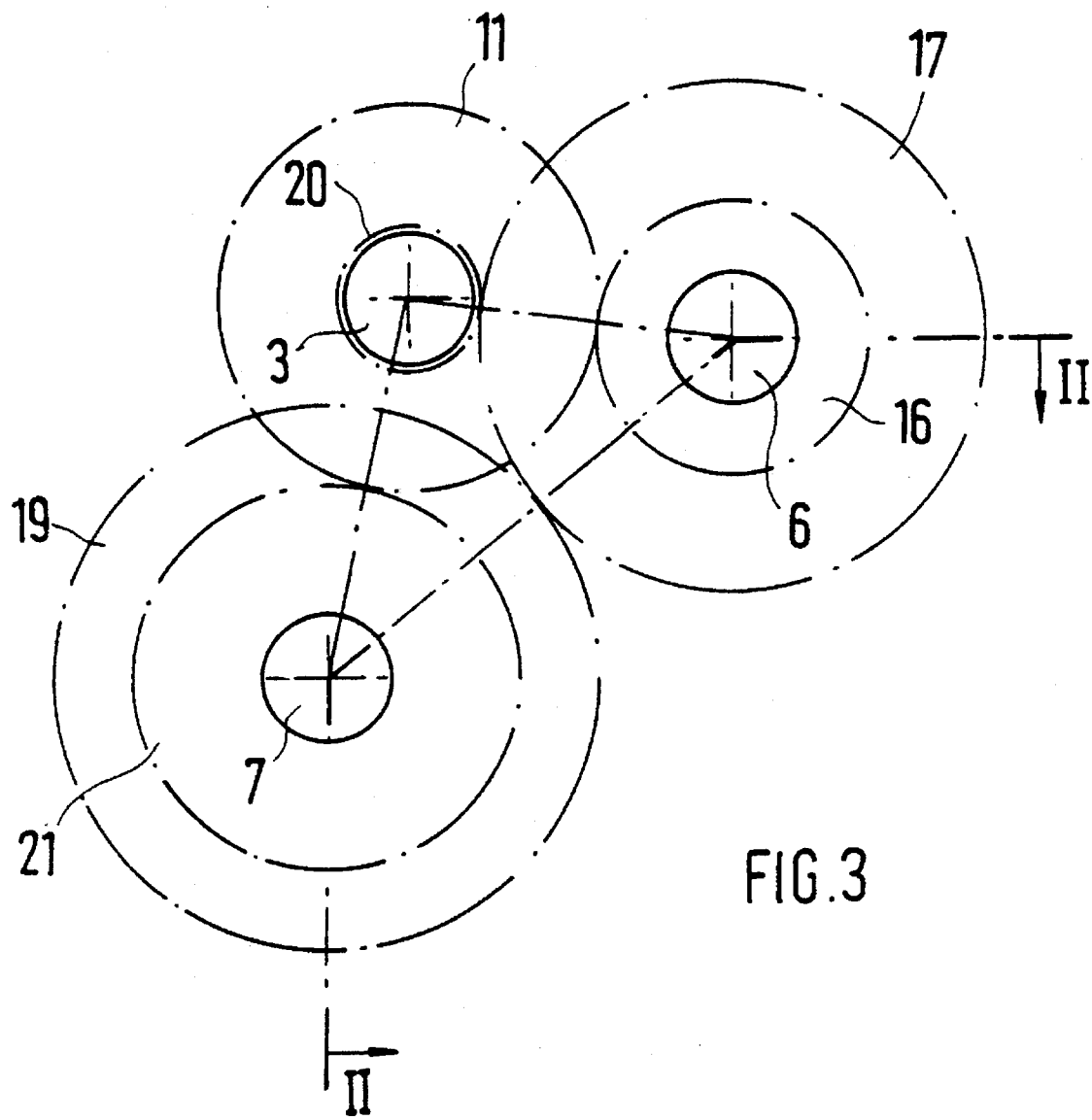
FIG. 3 is a gear diagram for engaging first gear.

As seen in FIG. 2, the drive shaft 3, output shaft 7, and auxiliary shaft 6 are mounted at one end in tapered roller bearings 10 in transmission housing 5. Between the drive shaft 3 and the output shaft 7 the following are located in this sequence: reverse gear R, third gear G3, second gear G2, fifth gear G5, and fourth gear G4.

Idler gears 11 and 12 of gears G5 and G4 are mounted on the drive shaft 3 while idler gears 13 and 14 of gears G3 and G2 are mounted on the output shaft 7. The idler gears are couplable with the corresponding shaft by synchronizing clutches 15.

To engage first gear G1, a fixed gear 16 mounted on auxiliary shaft 6 meshes with idler gear 11 of fifth gear G5. An intermediate gear 17 of reverse gear is likewise mounted on auxiliary shaft 6 and is connectable therewith by a half synchronizing clutch 18. Idler gear 19 of reverse gear R is mounted on the output shaft 7 and is couplable therewith by a half synchronizing clutch 18.

To engage first gear G1, the intermediate gear 17 meshing with a fixed gear 20 of the reverse gear R is coupled with auxiliary shaft 6 by the half synchronizing clutch 18. The power flows through the fixed gear 16 of the auxiliary shaft 6 to the idler gear 11 of G5, to the fixed gear 21 of G5 meshing therewith, and to the output shaft 7.

Figure 4:
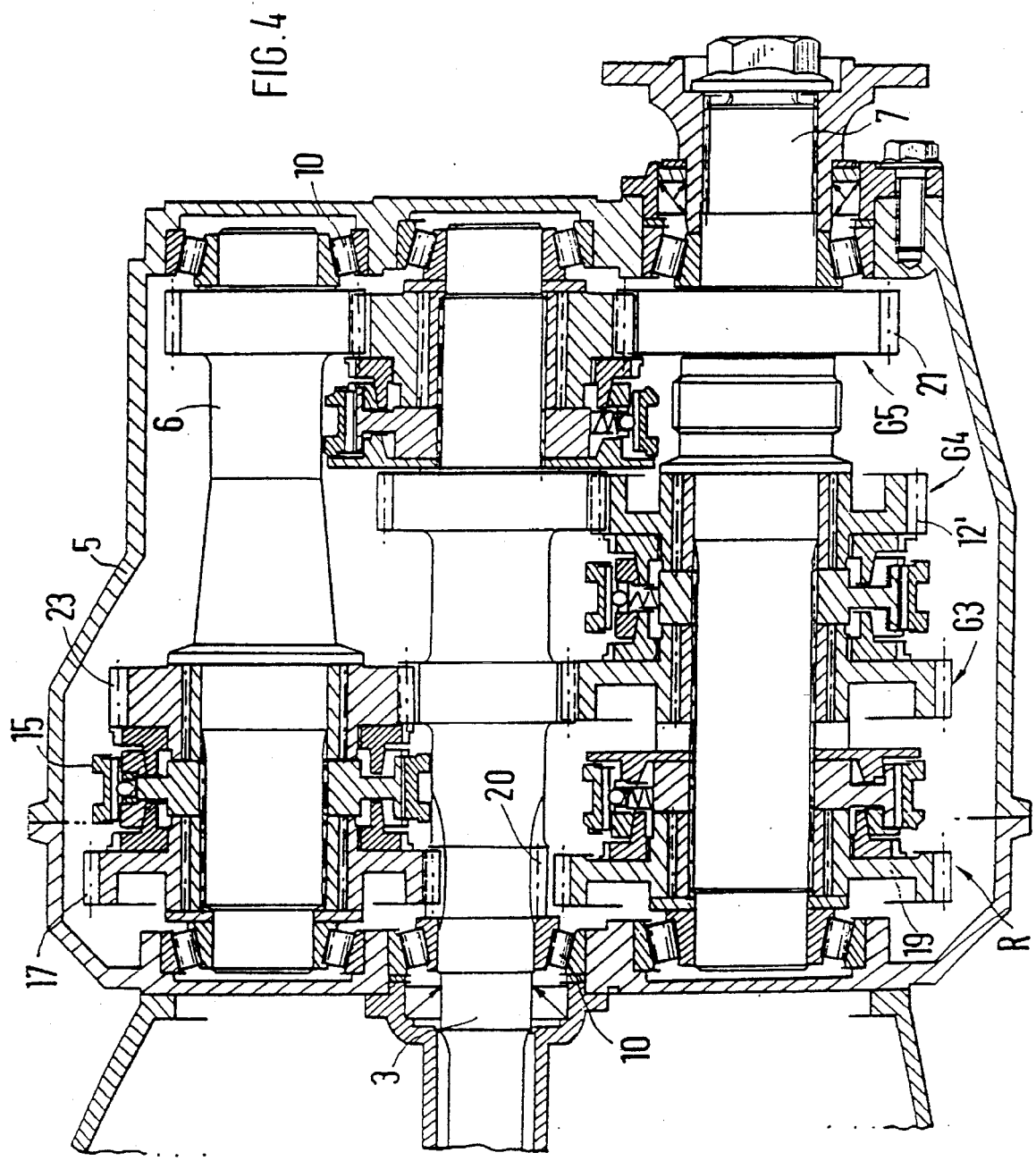
FIG. 4 is a lengthwise section through a three-shaft transmission with a short design constructed in accordance with another embodiment of the present invention.
Figure 5:
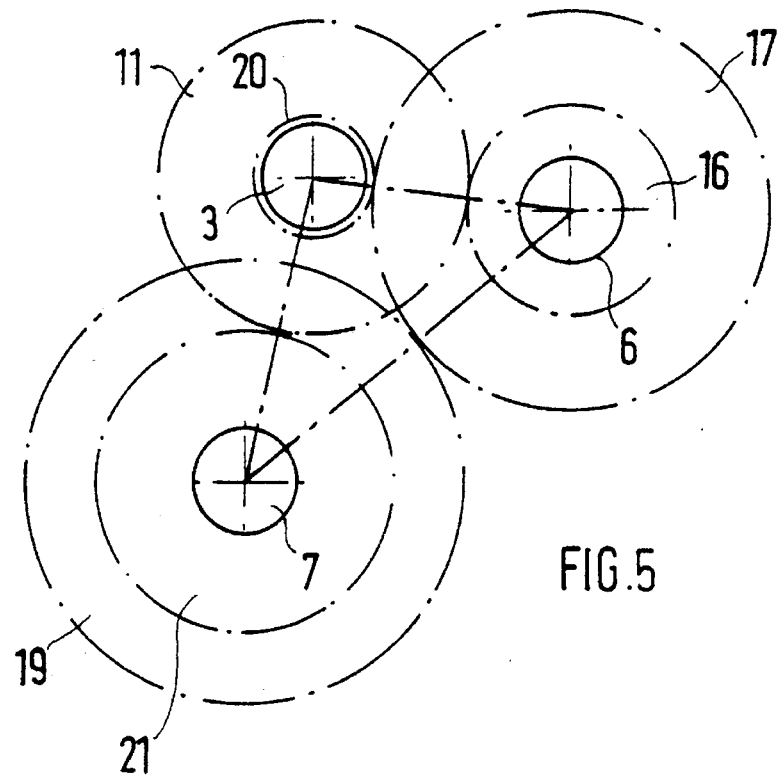
FIG. 5 is a gear diagram for engaging first gear in a transmission according to FIG. 4.
Figure 6:
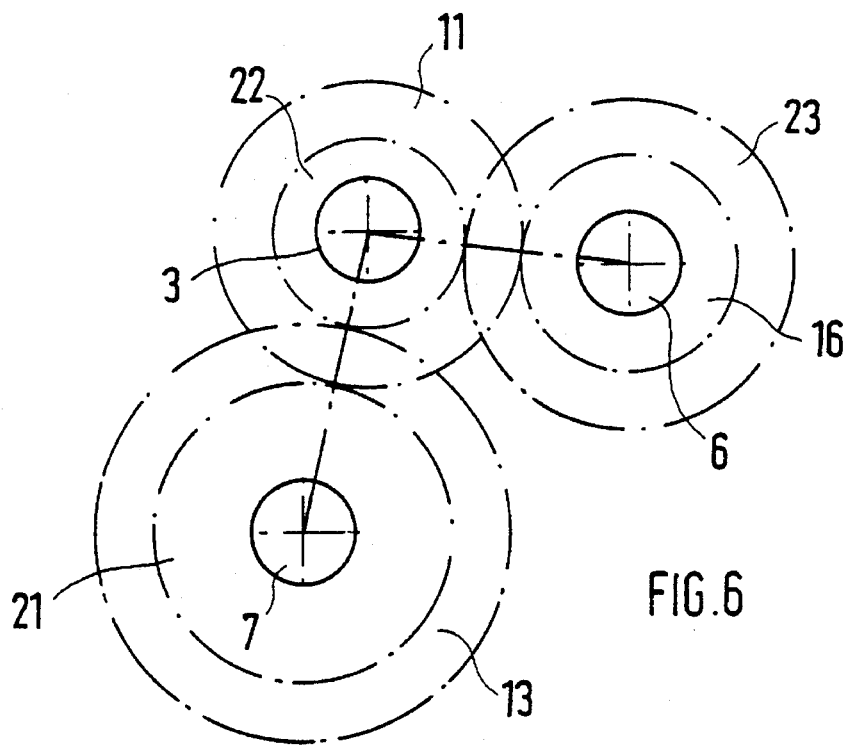
FIG. 6 is a gear diagram for engaging second gear.

In a transmission according to the embodiment of FIG. 4, a second gear is formed by multiple utilization of existing gear pairs. Between the drive shaft 3 and the output shaft 7 the gears are provided in this sequence: reverse gear, G3, G4, and G5. An additional idler gear 23 mounted on the auxiliary shaft 6 meshes with the fixed gear of G3 mounted on the drive shaft 3. The additional idler gear 23 is located adjacent to the intermediate gear 17 of reverse gear R and is couplable with the auxiliary shaft 6 by a synchronizing clutch 15 located between gears 17 and 23.

Shifting and power flow of first gear G1 are provided exactly in the same way as described for the embodiment of FIG. 2. To engage second gear, idler gear 23 is coupled with the auxiliary shaft 6. The power flows from fixed gear 22 of G3 to the idler gear 23, then the auxiliary shaft 6, the fixed gear 16, idler gear 11 of G5, and finally to the fixed gear 21 of G5 and the output shaft 7.

A five-speed transmission with a very short overall length can be provided with this arrangement. If, according to FIG. 1, in addition to the gear pair of G5 an additional gear pair is used, a six-speed transmission with a slightly larger overall length can also be provided. Because of their short overall length, such transmissions are especially suitable for transverse installation on the front axle.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A gearshift transmission of a motor vehicle comprising:
   a drive shaft;
   an output shaft parallel to the drive shaft;
   an auxiliary shaft;
   a plurality of forward gear ratios and a reverse gear ratio, said forward gear ratios and said reverse gear ratio having gear sets mounted on the drive shaft and the output shaft, the gear sets being engageable by synchronizing clutches, the gear sets including gear pairs, with at least one of said forward gear ratios and said reverse gear ratio being formed by utilization of multiple existing gear pairs, wherein a high-reduction first gear ratio includes the gear set of the reverse gear ratio and a fixed gear fixably mounted on the auxiliary shaft, the fixed gear meshing with a gear pair of a highest of the forward gear ratios.

2. A gearshift transmission according to claim 1, wherein a second gear ratio includes: an idler gear mounted on the auxiliary shaft and drivingly couplable with the auxiliary shaft; a fixed gear of a third gear pair, said idler gear mounted on the auxiliary shaft meshing with the fixed gear of the third gear pair; a fixed gear of the auxiliary shaft and a gear pair of a fifth gear ratio, the fixed gear of the auxiliary shaft meshing with the gear pair of the fifth gear ratio.

3. A gearshift transmission according to claim 1, wherein a reverse gear pair comprises a fixed gear and an idler gear, and wherein a third gear pair, a second gear pair, a fifth gear pair and a fourth gear pair are provided on the drive shaft and on the output shaft in sequence, and wherein the auxiliary shaft comprises a rotatably mounted intermediate gear of the reverse gear ratio and a fixed gear for forming the first gear ratio.

4. A gearshift transmission according to claim 2, wherein a reverse gear pair, the third gear pair, a fourth gear pair, and a fifth gear pair are provided in sequence on the drive shaft and on the output shaft, and wherein the auxiliary shaft comprises a rotatably mounted intermediate gear of the reverse gear ratio, said idler gear meshing with said fixed gear of the third gear pair, whereby the idler gear is selectively couplable with the auxiliary shaft to form the second gear ratio, and the intermediate gear is selectively couplable with the auxiliary shaft to form the first gear ratio.

5. A gearshift transmission according to claim 3, wherein idler gears of each of the reverse gear pair, the third gear pair, and the second gear pair are rotatably mounted on the output shaft, and wherein idler gears of each of the fifth gear pair and the fourth gear pair are rotatably mounted on the drive shaft and couplable therewith.

\* \* \* \* \*